Figure 1:
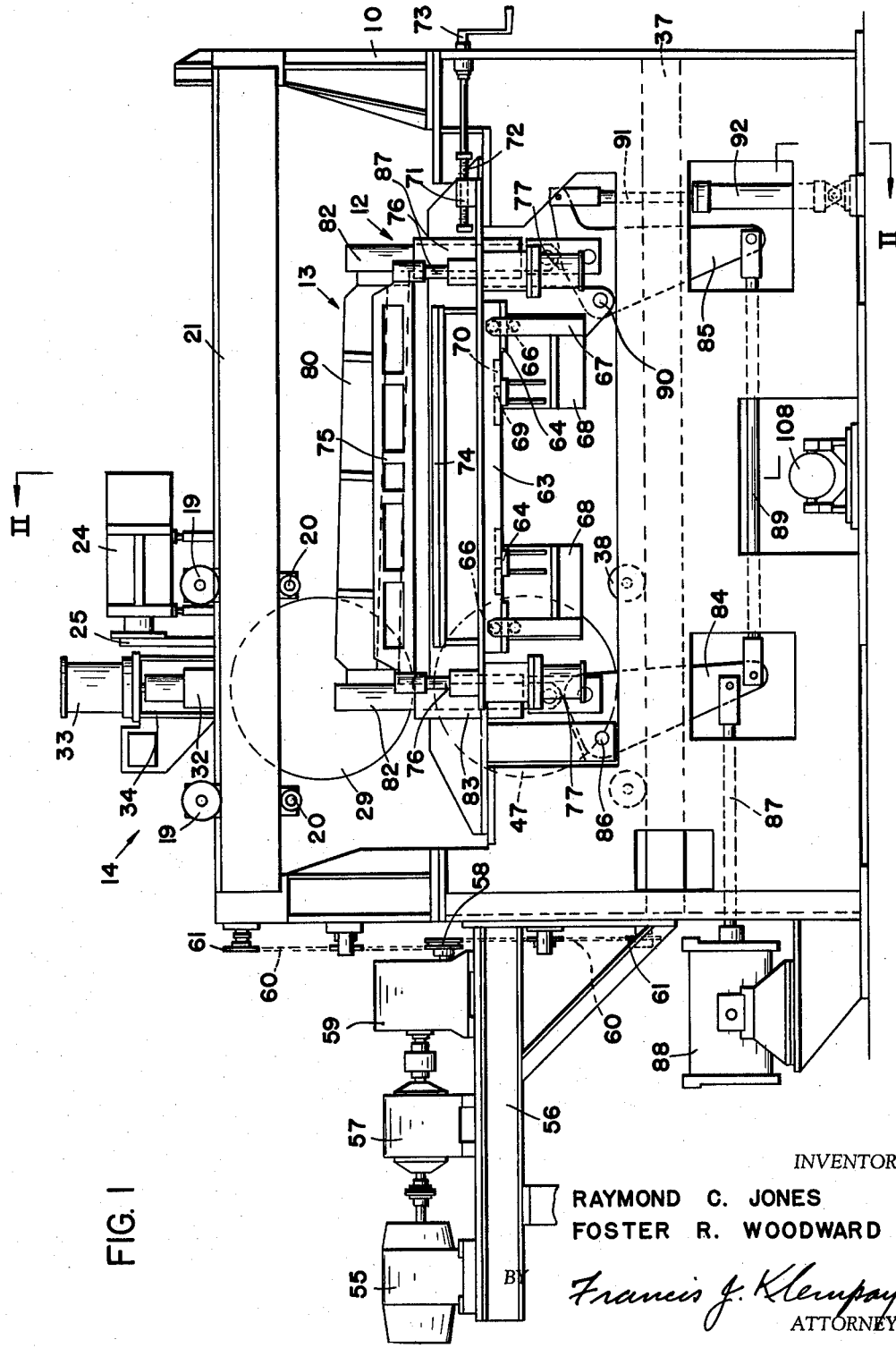

INVENTORS
RAYMOND C. JONES
FOSTER R. WOODWARD
BY Francis J. Klempay
ATTORNEY

Aug. 27, 1963

R. C. JONES ETAL 3,102,189

STRIP WELDING APPARATUS

Filed May 21, 1959

3 Sheets-Sheet 3

INVENTORS
RAYMOND G. JONES
FOSTER R. WOODWARD

BY *Francis J. Klempay*
ATTORNEY

United States Patent Office 3,102,189
Patented Aug. 27, 1963

3,102,189
STRIP WELDING APPARATUS
Raymond C. Jones, Lyndhurst Village, and Foster R. Woodward, Warren, Ohio, assignors to The Taylor-Winfield Corporation, Warren, Ohio, a corporation of Ohio
Filed May 21, 1959, Ser. No. 814,767
2 Claims. (Cl. 219—82)

The present invention relates generally to apparatus for joining the successive leading and trailing ends of coils of metal strip or the like and more particularly to improved apparatus of this type which is simplified in construction and operation but yet is adapted to complete the joining operation in a minimum of time.

As will be understood by those skilled in the art, welding apparatus may be employed for joining the successive leading and trailing ends of coils of metal strip and such apparatus is known as a strip welder. A strip welder is usually employed in a continuous process line and, as will be understood, the overall productivity and efficiency of such a continuous process line depends, to a great extent, upon the speed with which the strip welder is adapted to complete the joining operation.

It is a primary or ultimate object of the present invention to provide strip welding apparatus capable of completing strip joining operations in a minimum of time whereby the same is ideally suited for employment in continuous process lines. As will be hereinafter more fully apparent, the strip welding apparatus of the present invention comprises means for shearing, transversely aligning, weld clamping, clamping and indexing, gauging and welding the successive strip ends in a fast and highly efficient manner.

Another object of the invention is to provide improved strip welding apparatus which is adapted to be employed with different types of strips of greatly varying thickness dimensions. In many continuous process lines it is necessary and desirable to work strips of different thickness dimensions. For example, the thickness of the strip may vary from less than one sixty-fourth of an inch to one eighth of an inch. Also, the type of strip being worked may be changed—as for example from mild steel to carbon steel. The variations in thickness dimensions and the changes in types of strip present different welding requirements as will be understood. The strip welding apparatus of the present invention is very versatile in that the same is adapted to weld almost any type of strip over a wide range of thickness dimensions.

A further object of the invention is to provide improved strip welding apparatus embodying improved welding means. The welding means disclosed herein comprises two pairs of longitudinally spaced welding electrode wheels disposed above and below the normal path of strip travel. Each pair of electrode wheels is electrically connected to the secondary terminals of a welding transformer and the pairs of electrode wheels are so arranged and electrically connected that welding current is caused to flow from one of the welding electrode wheels of a first pair thereof, vertically through the overlapped ends of the strip, to the adjacent one of the electrode wheels of a second pair thereof, then to the second electrode wheel of said second pair, vertically through the overlapped ends of strip and to the other electrode wheel of the first pair thereof. This results in a pair of welds which are spaced longitudinally with respect to the normal path of strip travel.

A further object of the invention is to provide strip welding apparatus of the travel type which embodies improved means for mounting and moving the welding means. Each of the pairs of electrode wheels is mounted from a weld carriage which is guided for precise and accurate transverse movement by means of anti-friction rollers and rails.

Yet another object of the invention is to provide improved strip welding apparatus employing improved means for driving the two weld carriages mounting the pairs of electrode wheels in exact synchronism. This means for driving comprises a pair of accurately threaded shafts which are drivingly connected to the weld carriages and are driven from a common motor.

A further object of the invention is to provide improved strip welding apparatus embodying new and novel clamping and indexing means operative to clamp and properly position one of the ends of strip for welding. This means comprises a clamp which is mounted for longitudinal indexing movement to properly clamp and position the trailing strip end with respect to the electrode wheel is after shearing thereof and prior to the actual welding operation.

A still further object of the invention is to provide improved strip welding apparatus embodying improved means for effecting transverse alignment between the ends of strip to be joined.

A still further object of the invention is to provide strip welding apparatus having the characteristics set forth above which is of the utmost simplicity in both construction and operation.

The above, as well as other objects and advantages of the invention, will become more readily apparent upon consideration of the following specification and accompanying drawing wherein there is disclosed a preferred embodiment of the invention.

Figure 2:
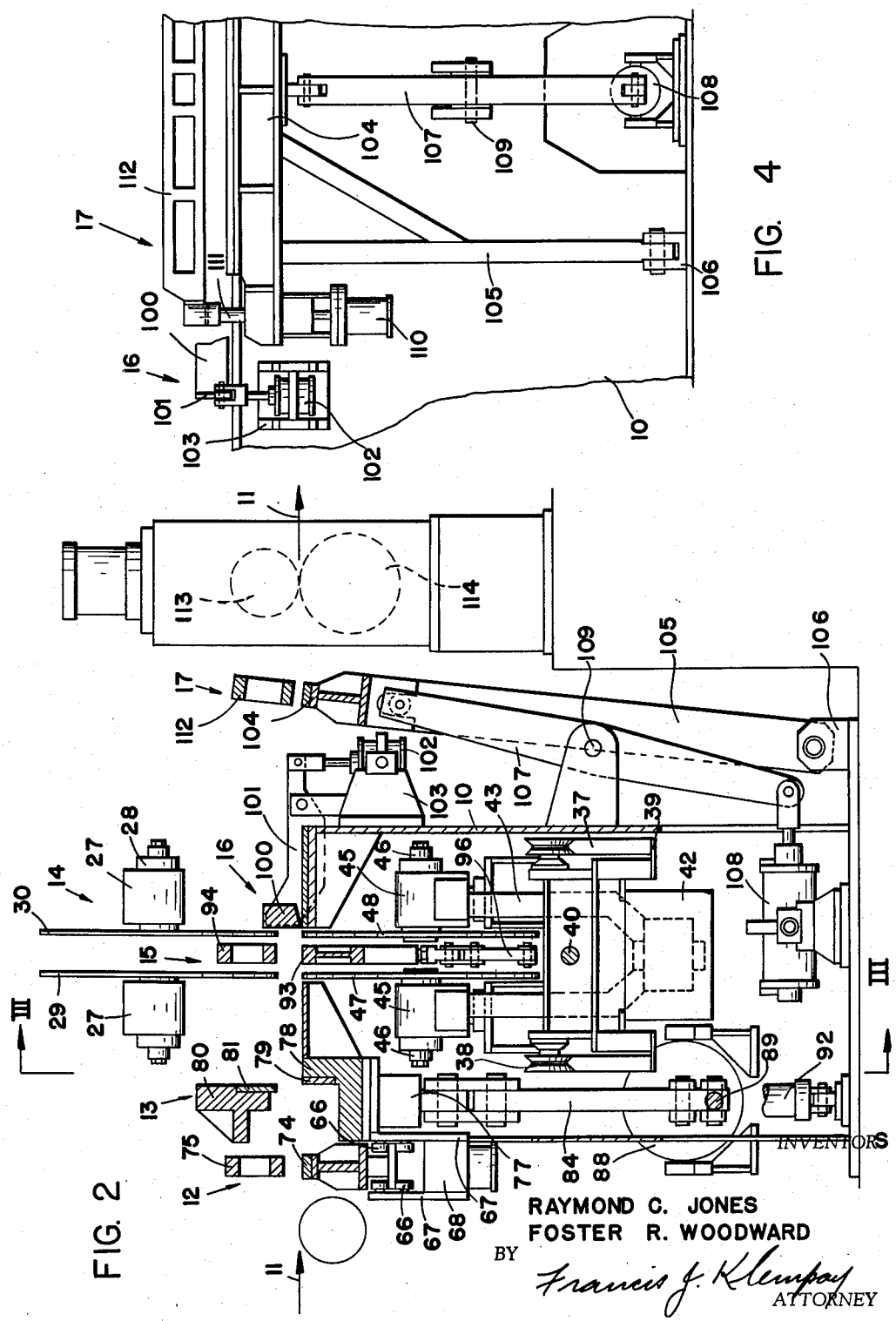
Figure 3:
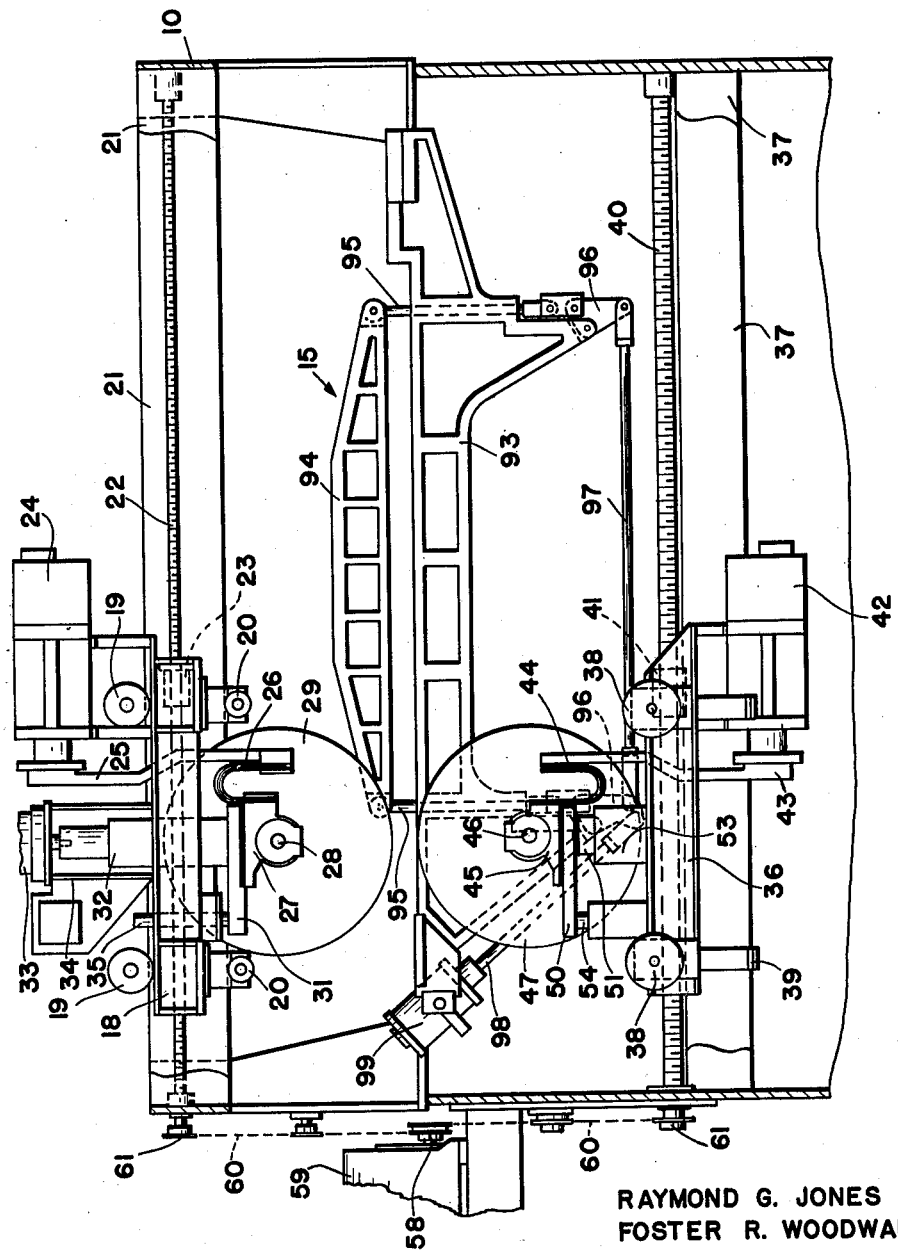

In the drawing:
FIGURE 1 is a longitudinal end elevational view of strip welding apparatus constructed in accordance with the teachings of the present invention;
FIGURE 2 is a side sectional view of the apparatus shown in FIGURE 1 taken along the section line II—II;
FIGURE 3 is an end sectional view taken along the section line III—III of FIGURE 2; and
FIGURE 4 is a fragmentary end view showing specifically the clamping and indexing means and the gauging means employed in the strip welding apparatus of the present invention.

Referring now to the drawing, there is shown strip welding apparatus constructed in accordance with the teachings of the present invention which comprises a housing 10 made from suitable structural plates and supporting members. The strip welding apparatus is adapted to be employed in a continuous process line with the strip passing in the direction indicated by arrows 11 in FIGURE 2 of the drawing. The strip welding apparatus comprises, in the direction of strip travel, transverse aligning means 12, shearing means 13, welding means 14, weld clamping means 15, gauging means 16 and strip clamping and indexing means 17. These various means will be described more fully hereinafter in the specification. In general, the arrangement is such that the leading and trailing strip ends are properly positioned in overlapped relation and are then traversed by the welding means 14 to join the same.

Construction

Considering first the construction and utilization of the welding means 14, there is provided an upper weld carriage 18 which is generally rectangular and mounts grooved rollers 19 from the top surface thereof adjacent each of its corners and cam follower rollers 20 from the bottom thereof adjacent each of its corners. The grooved rollers 19 and the cam follower rollers 20 are adapted to engage the opposite edges of a pair of transversely extending and longitudinally spaced rails 21. The rollers 19 and 20 are adjustable vertically relative to each other whereby the same may be pre-loaded and the arrangement is such that the upper weld carriage 18 is tightly mounted for anti-friction movement. To drive the upper weld carriage 18 there is provided threaded shaft 22 which extends the length of and is journaled in the ends of the housing 10. The threaded shaft 22 is positioned between the pair of spaced rails 21 and threadably engaging this shaft is a threaded nut 23 which is rigidly attached to the upper weld carriage 18. Upon proper rotation of the threaded shaft 22, by means to be hereinafter more fully described, the upper weld carriage 18 is caused to move transversely across the path of strip travel.

Rigidly mounted on and carried by the upper weld carriage 18 is a welding transformer 24 whose secondary terminals are connected to a pair of spaced and downwardly depending thick current conductors 25. Bolted or otherwise attached to the lower ends of the current conductors 25 are a pair of thick laminated flexible conductors 26 whose other ends are attached to the rear surfaces of a pair of longitudinally spaced journal housings 27. The journal housings 27 each journal a spindle 28, by means of anti-friction bearings, not shown, and embody means for transferring the electrical currents supplied thereto to the spindle 28, also not shown. Mounted on the inner ends of the two spindles 28 are an upper pair of electrode wheels 29 and 30. It will be noted that the electrode wheels 29 and 30 are spaced longitudinally and that these electrode wheels are connected to opposite secondary terminals of the welding transformer 24 by means of the apparatus above described.

The journal housings 27 are each rigidly attached to and insulated from a plate 31 which is carried at the lower end of an extension 32. The extension 32 is connected at its upper end to the piston rod of a fluid weld cylinder 33. The weld cylinder 33 is rigidly mounted by supports 34 from the upper weld carriage 18. The arrangement is such that, upon proper energization of the weld cylinders 33, the electrode wheels 29 and 30 may be lowered and raised into and from contact with the overlapped strip ends. Also, the weld cylinders 33 are operative to provide the necessary mechanical force to the electrode wheels 29 and 30 required to fuse or forge the welds during actual welding operations. Attached to the forward end of the plates 31 are guide rods 35 which are guided for movement in guiding means attached to the upper weld carriage 18 whereby movement of the upper electrode wheels 29 and 30 is limited to the vertical direction.

Disposed on the opposite side of and below the normal path of strip travel is a lower weld carriage 36 which is mounted for anti-friction movement along a pair of transversely extending and longitudinally spaced rails 37 by means of four V-shaped rollers 38 which engage the top edges of these rails and four L-shaped slides 39 which engage the lower edges thereof. The structure is such that the lower weld carriage 36 is mounted for friction-free movement along the longitudinally spaced parallel rails 37. To drive the lower weld carriage 36 there is provided a threaded shaft 40 which is disposed in parallel relation with and between the rails 37 and is engaged by an internally threaded nut 41 carried by the lower weld carriage 36. Upon proper rotation of the threaded shaft 40 the lower weld carriage may be caused to move transversely across the path of strip travel in the same manner as the upper weld carriage 18.

Mounted on the bottom surface of the lower weld carriage 36 is a welding transformer 42 whose secondary terminals are connected via a pair of upwardly extending spaced current conductors 43 and a pair of thick flexible laminated conductors 44 to a pair of spaced journal housings 45. Each of these journal housings rotatably mounts a spindle 46 and attached to the inner ends of the spindles 46 are the longitudinally spaced electrode wheels 47 and 48. It will thus be seen that the electrode wheels 47 and 48 are mounted for rotation about their own axes and are connected to opposite secondary terminals of a welding transformer 42.

Each of the journal housings 45 is attached to and insulated from a plate 50 and these plates are mounted at the top ends of lifting rods 51. The lifting rods 51 are supported from pedestals 53 and suitable means, not particularly shown, are provided in the pedestals 53 to allow adjustment of the vertical positions of the electrode wheels 47 and 48. This adjustment is infrequently made but is embodied to allow compensation for decrease in the diameters of the lower pair of electrode wheels 47 and 48 due to prolonged usage thereof. As will be understood, the lower electrode wheels 47 and 48 must be disposed tangentially with respect to the path of strip travel. Guide rods 54 are provided for limiting adjusting movement of the lower electrode wheels 47 and 48 to a vertical direction.

For driving both the upper and lower threaded shafts 22 and 40, respectively, a common drive motor 55 is mounted on a suitable supporting platform 56 extending outwardly from one side of the housing 10. The drive motor 55 has its drive shaft interconnected to an electromagnetic clutch and brake 57 which in turn drives a sprocket 58 through a speed transmission 59. The sprocket 58 is connected by means of a pair of endless chains 60 with a pair of sprockets 61 mounted at the outer ends of the threaded shafts 22 and 40. Thus, upon actuation of the drive motor 55 and proper energization of the speed transmission 59 and of the electro-magnetic clutch and brake 57, the threaded shafts 22 and 40 will be rotated to move the upper and lower weld carriages 18 and 36, respectively, in synchronism transversely across the path of strip travel. The speed transmission 59 is employed to change the speed of movement of the various electrode wheels to accommodate different types of and/or thicknesses of strip. Also, the electro-magnetic clutch and brake 57 allows the welding means to complete a pair of longitudinally spaced continuous seam welds across the overlapped strip end or a pair of longitudinally spaced lines of intermittent spot welds across the overlapped strip ends.

The welding transformers 24 and 42 are so connected that an electrode wheel of each pair thereof assumes an electrical polarily which is opposite to the electrical polarity assumed by the adjacent electrode wheel of the opposite pair thereof. For example, the welding transformer 24 may be connected so that the electrode wheel 29 assumes a positive polarity with respect to the electrode wheel 30. Then the welding transformer 42 would be connected so that the electrode wheel 48 assumes a positive polarity with respect to the electrode wheel 47. Thus, during actual welding operations, current is caused to flow from the welding electrode wheel 29 through the overlapped strip ends to the welding electrode wheel 47 and then from the welding electrode wheel 48 up through the overlapped strip ends to the welding electrode wheel 30. The welding current flows in a series circuit which comprises all four of the electrode wheels and both secondaries of the welding transformers 24 and 42.

The transverse aligning means 12 and the shearing means 13 are shown in detail in FIGURES 1 and 2 of the drawing and reference should be had thereto during the following portion of the specification. The transverse aligning means 12 is adapted to allow transverse alignment of the strip ends prior to actual welding operations. The transverse aligning means comprises a plate-like support 63 having a pair of longitudinally projecting and transversely spaced slides 64 attached to the bottom surface thereof. These slides are each engaged by longitudinally spaced pairs of vertically disposed rollers 66 which are journaled at the upper ends of spaced arms 67. The arms 67 are rigidly attached to brackets 68 which are in turn rigidly attached to the housing 10. The brackets 68 each mount a further cam roller 69 that is adapted for rotation about a vertical axis and is received in a slot 70 in the bottom surface of the plate-like support 63. It will be thus be seen that the plate-like support 63, and all apparatus carried thereby, is adapted for anti-friction movement transversely of the path of strip travel. To adjust the position of the plate-like support 63 there is mounted thereon an internally threaded fixture 71 which engages a threaded shaft 72. The shaft 72 is journaled in the housing 10 and is rotated by turning a crank 73 whereby the plate-like support 63 is adjusted transversely.

Mounted from the plate-like support 63 is a lower clamping platen 74 which is disposed below the normal path of strip travel. An upper clamping platen 75 is disposed above the lower clamping platen and is supported at its ends by a pair of vertically extending rods 76 that extend through and below the plate-like support 63 and are drivingly connected to a pair of transversely spaced fluid clamp actuating cylinders 77. These cylinders are mounted from the lower surface of the plate-like support 63.

When it is desired to transversely align the strip ends the clamping cylinders 77 are energized to lower the upper clamping platen 75 into clamping relation with one of the strip ends and the lower clamping platen 74. Then, while the strip end is still clamped, the operator turns the crank 73 to transversely shift the plate-like support 63 and the clamped strip end until the same is properly and transversely aligned with the other strip end.

The shearing means 13 comprises a stationarily mounted lower shear carrier 78 carrying a lower shear blade 79 and a vertically movable upper shear carrier 80 carrying an upper shear blade 81. The shear carriers 78 and 80 and the shear blades 79 and 81 extend transversely across the normal path of strip travel. Attached to the opposite ends of the upper shear carrier 80 and outwardly of the lower shear carrier 78 are a pair of large diameter rods 82 which extend vertically through guides 83 and are pivotally connected at their lower ends to a pair of bellcranks 84 and 85. The bellcrank 84 is pivotally mounted from the frame 10 at 86 and is pivotally connected to the piston rod 87 of a fluid shearing cylinder 88 which is mounted outwardly of and to one side of the housing 10. Pivotally interconnecting the bellcrank 84 and the bellcrank 85 is a tranversely extending tie rod 89. The bellcrank 85 is pivoted to the housing 10 at 90 and has one arm thereof pivotally connected to the piston rod 91 of an auxiliary fluid shearing cylinder 92. This latter cylinder is mounted within the confines of the housing 10.

In the operation of the shearing means 13 the shearing cylinder 88 and the auxiliary shearing cylinder 92 are actuated to pivot the bellcranks 84 and 85 about their pivot points 86 and 90, respectively, to move the upper shear carrier 80 and the upper shear blade 81 vertically through a shearing stroke. The shearing cylinders 88 and 92 are actuated simultaneously and the laterally extending tie rod 89 insures that both bellcranks will be pivoted synchronously whereby the upper shear carrier 80 and the upper shear blade 81 move through a shearing stroke in a free and easy manner. The shearing means is, of course, designed to shear the maximum thickness of the hardest to shear type of strip material to be joined by the strip welding apparatus.

The weld clamping means is shown in detail in FIGURE 3 of the drawing and comprises a lower and stationarily mounted weld clamping platen 93 which extends transversely across the path of strip travel and is positioned between the pairs of longitudinally spaced electrode wheels 29, 47 and 30, 48. Mounted above the lower weld clamping platen 93 is an upper weld clamping platen 94 whose ends are pivotally attached to vertical rods 95 which extend downwardly through and are guided for vertical movement in the lower weld clamping platen 93. The vertical rods 95 are pivotally mounted at their lower ends to a pair of laterally spaced bellcranks 96 which are interconected by means of a tie rod 97. Each of the bellcranks 96 is also pivotally attached to the lower weld clamping platen 93 and one of these bellcranks is further pivotally connected to the piston rod 98 of a weld clamping cylinder 99. The weld clamping cylinder 99 is mounted within the confines of the housing 10 outwardly of the normal path of strip in downwardly angled relation. Upon proper actuation of the weld clamping cylinder 99 the upper weld clamping platen 94 is lowered into tight clamping engagement with the lower weld clamping platen 93 and the overlapped strip ends supported thereon. It will be noted that the overlapped strip ends are clamped closely adjacent the welding electrode wheels whereby the strip ends are very securely held during actual welding operations.

The gauging means 16 comprises a gauge bar 100 which extends transversely across the normal path of strip travel. The gauge bar has an accurately machined forward face defining a gauge surface and attached to the gauge bar at its opposite ends are a pair of longitudinally extending arms 101. The arms 101 are pivoted to the housing 10 at points intermediate their ends and are drivingly connected with a pair of fluid gauging cylinders 102 mounted by brackets 103 from the housing 10 on opposite sides of the normal path of strip travel. When the gauging cylinders 102 are properly actuated the gauge bar 100 is lowered whereby the forward face thereof defines a gauging surface for limiting the movement of and properly positioning the leading end of a coil of metal strip.

The improved clamping and indexing means 17 of the present invention is depicted in FIGURES 2 and 4 of the drawing. This means comprises a lower clamping platen 104 which extends transversely across the path of strip travel having a pair of downwardly depending legs 105 that are pivotally mounted at their lower ends between clevises 106. The clevises 106 are attached to the housing 10 and the arrangement is such that the lower clamping platen 104, and all apparatus carried thereby, is adapted for longitudinal pivotal movement.

To effect this movement there is provided a bellcrank 107 whose upper end is pivotally connected to the lower clamping platen 104 and whose lower end is pivotally connected with a fluid indexing cylinder 108. The bellcrank 107 is also pivotally mounted at a point 109 intermediate its ends whereby upon actuation of the indexing cylinder 108 the lower clamping platen 104 will be caused to move longitudinally with respect to the normal path of strip travel. The length of travel of the piston rod of the indexing cylinder 108 is accurately controlled by means, such as a nut threaded on the piston rod, not particularly shown, whereby the amount of indexing movement may be very accurately and adjustably limited.

Mounted at the opposite ends of a lower clamping platen 104 in downwardly depending relation with respect thereto are a pair of fluid clamping cylinders 110 whose piston rods are drivingly connected to a pair of vertically extending rods 111. The vertically extending rods 111 project through and are guided by the lower clamping platen 104 and mount at their upper ends a transversely extending upper clamping platen 112. The construction is such that the trailing strip end may be clamped upon actuation of the clamping cylinders 110 to lower the upper clamping platen 112 into clamping relation therewith. Then the indexing cylinder 108 is actuated to move the strip into proper position with respect to the welding electrode wheels.

In addition to the above described apparatus, the strip welder will comprise other ancillary apparatus which is not particularly shown and will not be described in detail in this specification. For example, control means are incorporated for sequencing the operations of the strip welder in an automatic manner and electrical control means are, of course, utilized to control the supply of welding current to the various electrode wheels. Such control apparatus does not, in and of itself, form a part of the present invention. Also, the strip welder is adapted to be employed in connection with certain strip handling apparatus of the type normally found in a continuous process line. For example, a pair of exit side pinch rolls 113 and 114 along with a pair of entry side pinch rolls, not shown, and an external shear positioned at the entry side of the strip welder, also not shown, would normally be employed. The pairs of pinch rolls are operative to move the strip ends to and through the strip welding apparatus while the external shear is adapted to crop the leading strip end.

The employment and utilization of various means and apparatus described above will perhaps best be understood by considering the operation of the strip welder as is set forth below.

*Operation*

It will be assumed that initially the strip welding apparatus is completely open—that is all of the various clamps are open, the shearing means is open, the upper pair of electrode wheels are retracted and the gauging bar is in its vertically retracted position— and that strip is moving through the strip welder. As the trailing end of the strip begins to move through the welder the pinch rolls 113 and 114 are operated to stop the strip in a position where its extreme rear end portion overhangs the lower shear blade 79. At this time the clamping cylinders 110 of the clamping and indexing means 17 are actuated to lower the upper clamping platen 112 into clamping engagement with the trailing strip end and the lower clamping platen 104. With the trailing strip end so clamped the shearing cylinders 88 and 92 are actuated in a manner to move the upper shear carrier 80 and the upper shear blade 81 vertically through a shearing stroke to crop the extreme rear end portion of the trailing strip end. Then, simultaneously, the pinch roll 113 is vertically retracted and the indexing cylinder 108 is actuated to move the clamped trailing strip end in the direction of strip travel whereby the extreme end portion of the strip moves from the lower shear blade 79 to a point closely adjacent the line of travel of the welding wheel electrodes 29 and 47. The amount of this indexing movement is accurately controlled by the adjustable stop means for the indexing cylinder 108 and it will be noted that during this indexing movement that the trailing strip end is firmly clamped at all times.

After the trailing strip end has been sheared and moved into proper position the pinch roll 113 is again lowered to engage the trailing strip end. The gauging cylinders 102 are energized to pivot the gauge bar 100 downwardly into pressure contact with the trailing strip end and obstructing relation with respect to the normal path of strip travel.

The leading end of a successive strip, which has previously been cropped by the external shear, not shown, is moved into the strip welding apparatus until the extreme forward end thereof abuts against the gauging surface of the gauge bar 100. At this time both the leading and trailing ends of the strips are properly positioned longitudinally with respect to the welding electrode wheels.

If the strips are not in proper transverse alignment the operator energizes the clamping cylinder 77 to lower the upper clamping platen 75 into clamping relation with respect to the leading strip end and the lower clamping platen 74. Then the crank 73 is turned until the leading strip end is transversely aligned with respect to the trailing strip end.

With the strip ends longitudinally positioned and transversely aligned the weld clamping cylinder 99 is actuated to bring the upper weld clamping platen 94 into tight pressure engagement with the over lapped strip ends and the lower weld clamping platen 93. At this time it will be noted that the strip ends are properly positioned for welding and are firmly clamped between and on both sides of the vertically aligned pairs of the welding electrode wheels 30, 48 and 29, 47.

The weld cylinders 33 are now energized to lower the upper pair of welding electrode wheels 29 and 30 into contact with the overlapped strip ends and the lower pair of welding electrode wheels 47 and 48. The drive motor 55 is energized to rotate the threaded shafts 22 and 40 through the drive connection comprising the speed transmission 59, the electro-magnetic clutch and brake 57, and the chains 60 and sprocket 61 whereby the weld carriages 18 and 36 mounting the two pairs of welding electrode wheels begin to move in synchronism transversely with respect to the overlapped strip ends. As the welding electrode wheels roll onto the overlapped strip ends the welding transformers 24 and 42 are energized in a controlled manner whereby welding current is caused to flow vertically through these overlapped strip ends at two longitudinally spaced points. This welding current heats and softens the overlapped strip ends and the welding cylinders 33 maintain sufficient pressure to fuse the overlapped strip ends together thereby completing the welds.

As intimated above, the strip welding apparatus is adapted to complete continuous lines of weld extending transversely across the strip or intermittent lines of weld extending transversely across the strip. In the first instance the pairs of electrode wheels will continuously roll across the overlapped strip ends to complete the two continuous lines of weld. In the second instance the electrode wheels will stop at spaced points to complete pairs of longitudinally spaced spot welds thereby defining two lines of intermittent welds. The amount of transverse spacing between the pairs of spot welds is controlled by proper energization of the electro-magnetic brake and clutch 57. Of course, the operator is provided with control apparatus which allows him to select whether continuous seam welds or roller spot welds are to be effected. In this manner, the welding means is very versatile in that a welding sequence best adapted to the type of strip being welded may be selected. For example, continuous seam welding may be employed with strips of relatively small thickness dimensions while intermittently driven roller spot welding may be employed with strips having relatively large thickness dimensions.

As the two pairs of electrode wheels reach and roll off the other side of the overlapped strip ends the flow of welding current is interrupted and the welding electrode wheels 29 and 30 are vertically retracted by the welding cylinders 33. All of the upper clamping platens—75, 94 and 112—are retracted along with the gauge bar 100 and the welded strips are then free to move through the welder. As the strips moves through the welder the clamping and indexing means 17 is moved back to its original position and the welding electrode wheels are also moved back across the strip to their original starting positions. However, the return of the welding electrode wheels is not completely necessary since the welding means is adapted to weld in either transverse direction. The strip welding apparatus is now ready for another operational cycle to join the successive ends of strips as is required.

*Summary*

It should thus be apparent that we have accomplished the objects initially set forth by providing highly improved strip welding apparatus. Of particular importance is the extremely fast and efficient manner in which the strip ends may be joined. Also, the welding means disclosed herein allows the strip welding apparatus to join different types of strip having varying thickness dimensions which may be worked in a continuous process line. The improved clamping and indexing means is operative not only to clamp the trailing strip end but also to properly position the same with respect to the welding means in a highly efficient and improved manner. The transverse aligning means clamps the leading strip end and is operative in an improved manner to effect transverse alignment of the strip ends.

Although we have disclosed an illustrated embodiment constructed in accordance with the teachings of the invention, it should be apparent that many changes may be made therein. Accordingly, reference should be had to the following appended claims in determining the true scope and intent of the invention.

We claim:

1. Apparatus for joining strip in general end-to-end relation comprising a unitary assembly of a base having a strip passage therethrough, welding means mounted on said base intermediate the strip entry and exit ends thereof and movable transversely across said passage whereby strip end portions may be welded together, a shear mounted on the entry end of said base and operative to trim the tail end of a strip length lying in said passage, and a movable strip clamp mounted on the exit end of said base and operative to advance said strip length through a predetermined controlled distance to move the trimmed tail end thereof from the shear to the welding means, said movable strip clamp comprising an upstanding frame pivotally mounted at its bottom end on the bottom end portion of said base and carrying a strip clamp at its upper free end, and a fluid-pressure actuator for swinging said frame through a predetermined arc of movement.

2. Apparatus for joining strip in general end-to-end relation comprising a base having a strip passage therethrough and upper and lower clamp bars extending transversely of said passage and adapted to engage opposite surfaces of overlapped strip end portions to retain the same in clamped condition with ends thereof projecting outwardly of opposite sides of said bars, a strip shear mounted on said base forwardly of said clamp bars, means to open and close said clamp bars, a movable strip clamp mounted on said base rearwardly of said clamp bars, means to move said movable strip clamp through a predetermined controlled distance to advance the sheared tail end of a length to strip to a predetermined position adjacent said clamp bars, upper and lower welding assemblies each comprised of a welding transformer and a pair of spaced parallel electrode wheels mounted on said base for transverse movement across said passage with the electrodes of each pair being disposed on opposite sides of said clamp bars, a transversely extending and vertically retractable gauge bar positioned between said electrodes and movable strip clamp and being operative when moved downwardly to engage the said advanced strip length and to be engaged by the leading edge of a next succeeding strip length being moved along said passage to properly position said leading edge with respect to said clamp bars, and means to move said assemblies in unison, the electrodes of one of said assemblies being vertically aligned with the electrodes of the other of said assemblies, means to exert welding forces to the vertically aligned pairs of said electrodes, the arrangement being such that by reversing the polarity of the power connection of one of said transformers with respect to the power connection of the other of said transformers each vertical pair of electrodes will effect a seam weld between overlapped portions of said strip lengths.

References Cited in the file of this patent

UNITED STATES PATENTS

| | | |
|---|---|---|
| 1,708,769 | Mathieu | Apr. 9, 1929 |
| 1,776,587 | Holmes et al. | Sept. 23, 1930 |
| 2,344,534 | Bucknam et al. | Mar. 21, 1944 |
| 2,412,648 | Rendel | Dec. 17, 1946 |
| 2,455,564 | Dailey | Dec. 7, 1948 |
| 2,515,264 | Rasmusen | July 18, 1950 |
| 2,957,071 | Cooper et al. | Oct. 18, 1960 |
| 2,970,206 | Uhrain | Jan. 31, 1961 |

FOREIGN PATENTS

| | | |
|---|---|---|
| 877,233 | France | Sept. 1, 1942 |